United States Patent Office 3,431,062
Patented Mar. 4, 1969

3,431,062
ANTIEVAPORANT PROCESS AND COMPOSITION
Richard C. Fox, San Rafael, Calif., assignor to Chevron Research Company, a corporation of Delaware
No Drawing. Filed Oct. 26, 1964, Ser. No. 406,554
U.S. Cl. 21—60.5                                      3 Claims
Int. Cl. C09k 3/00; E03b 3/40

ABSTRACT OF THE DISCLOSURE

Composition for retarding water evaporation consisting essentially of from 70 to 99.4% by weight of a hydrocarbon oil, from 0.5 to 10% by weight of a wax and from 0.1 to 20% by weight of a copolymer of an alkyl methacrylate and vinyl pyrrolidone.

---

This invention relates to a process and compositions which are effective in reducing evaporation of water. More specifically, the invention is concerned with compositions which are applied to the surface of water and ponds, lakes and reservoirs, etc., and will significantly reduce loss by evaporation.

The loss of water from open storage by evaporation is a well known problem that is becoming more serious with the world industrial growth and population boom and the consequent increased use of water for industrial, personal and farming uses. The evaporation loss is particularly high in arid, desert areas—such as the southwestern part of the United States, where water conservation is of the highest importance due to the initial scarcity of water in these low-rainfall areas. Loss of water in the United States has been estimated to be as high as 70% of the total rainfall or as much as the total required by the cities and towns of the country.

It is known that certain high molecular weight alcohols, in particular cetyl alcohol are effective as a monolayer upon water surfaces in reducing water evaporation. However, the high cost of the alcohols, the difficulty in keeping the monolayer spread under wind conditions and the fact that certain types of bacteria are supported by the alcohols thus makes them not entirely satisfactory for this purpose. It is thus of great importance to provide compositions which will disperse easily upon water surfaces, successfully reduce evaporative loss of water, be comprised of materials of sufficiently low cost to make application of the composition to large bodies of water practicable and be resistant to destruction of the film by wind and wave action.

It has now been found that evaporation of water can be successfully retarded by the application to the water of a composition comprising from about 70%–99.4% by weight of a hydrocarbon oil, from 0.5–10% by weight of a wax and from 0.1–20% by weight of a copolymer of an alkyl methacrylate and N-vinyl pyrrolidone.

The hydrocarbon oils which may be employed in the composition of this invention include mineral lubricating oils such as naphthenic base and paraffinic base lubricating oils, etc. It is also desirable that the oil should not evaporate easily, therefore, it should boil predominantly above about 500° F. Particularly suitable are those oils that have an initial boiling point above 600° F. It is preferred that the oil have a viscosity of from about 50 to 500 SSU at 100° F. More viscous oils are not desirable because of difficulty encountered in spreading the films obtained.

The waxes which are employed in the composition of this invention are petroleum waxes and are more preferably paraffin waxes. Paraffin wax is a solid, crystalline, hydrocarbon mixture wholly derived from that portion of crude petroleum commonly designated paraffin distillates; from shale distillates; or from hydrocarbon synthesis, by low temperature solidification and expression or by solvent extraction. It is distinguished by its solid state at room temperature, relatively slight deformation at this temperature, even under considerable pressure, and low viscosity, from 35–45 SSU at 210° F. when melted. Preferably, the waxes are highly normal paraffinic because these waxes disperse as platelets in the oil phase of the composition. The platelets are especially effective in forming a water vapor barrier. Although the paraffinic waxes are most desirable, microcrystalline waxes and mixtures of microcrystalline and paraffinic waxes may also be employed in the compositions of the invention. Natural waxes such as bees wax, etc., may also be used, however, they are somewhat less effective than the paraffinic waxes.

The surface active materials which are employed in the compositions are oil soluble copolymers comprised of monomeric constituents of alkyl methacrylate and vinyl pyrrolidone. The alkyl substituent may have from 8 to 24 carbon atoms. An example of a commercially available compound is a copolymer having a molecular weight of about 220,000 and having mixed higher alkyl radicals in the alkyl chain. Another specific example is an alkyl methacrylate-vinyl pyrrolidone copolymer having a molecular weight of approximately 300,000 and a nitrogen content of about 1%, and in which the alkyl radicals are mixed $C_{12}$ and $C_{18}$ alkyl radicals. Another preferred species is a dodecyl methacrylate/N-vinyl pyrrolidone copolymer having a molecular weight of about 550,000.

For these purposes of this invention the copolymers may have molecular weights of from 100,000 to 11,000,000.

The surfactants are employed in amounts of from 0.1 to 20% by weight of the total composition. Amounts of from 1 to 10% by weight are preferred.

The antievaporant compositions of the invention are contacted with the surface of the water by pouring them on to the surface of the water and allowing the material to spread. The spreading may be accomplished without the aid of a supplementary agent, however, if desired, a hydrocarbon having from 5 to 10 carbon atoms may be employed to aid in the dispersal. Examples of hydrocarbons suitable for this purpose are normal pentane, normal hexane, normal octane, isooctane, etc. Mixtures of the hydrocarbons such as petroleum distillates may be employed. When using this supplementary hydrocarbon spreading agent, it is employed in amounts of up to 60% by weight of the total composition. In dispersing the antievaporant compositions, they may be emulsified with any of the commonly known emulsifying agents and the resulting emulsion poured on to the surface of the water. Examples of emulsifying agents which may be employed are alkyl benzene sulfonates, aliphatic and aromatic quaternary amines, etc.

The following examples illustrate the methods and compositions of this invention. The examples are, of course, only illustrative and not limiting.

Example 1

Tricomponent compositions were prepared utilizing 2% 140/142 AMP paraffin wax, 88% of a solvent refined paraffin base lubricating oil having a viscosity of about 105 SSU at 100° F. and 10% of each additive. The additives employed were as follows:

A. Copolymer of dodecyl methacrylate and N-vinyl pyrrolidone having a molecular weight of approximately 550,000.

B. Copolymer of alkyl methacrylate and vinyl pyrrolidone having a molecular weight of about 220,000 and having mixed $C_{12}$ and $C_{18}$ radicals in the alkyl chain.

In the test, the antievaporant compositions were placed on the surface of water in a vessel wherein the surface area was 120.25 sq. in. (0.835 sq. ft.). Two controls were employed using no coating and each of the composition was tested in other vessels. 0.1 gram of each antievaporant composition was added to the water surface. The loss of water by evaporation was measured and recorded in $\frac{1}{16}$" in some cases at the end of 7, 14 and 21 days, and in others at the end of 6, 13 and 21 days. The percentage efficiency of each antievaporant composition was calculated as:

100 × average change depth controls
— Change depth treatment
―――――――――――――――――――――――
Average change of depth of controls Table I following sets forth these data:

TABLE I

| Treatment | Amt. gm. | 6 days | 7 days | 13 days | 14 days | 21 days | Percent efficiency | | |
|---|---|---|---|---|---|---|---|---|---|
| | | | | | | | 13 days | 14 days | 21 days |
| | | | −13 | | −25 | −38 | | | |
| | | | −14 | | −27 | −40 | | | |
| | | −13 | | −26 | | −42 | | | |
| | | −12 | | −26 | | −42 | | | |
| B | 0.1 | | −4 | | −10 | −18 | | 61.5 | 53.8 |
| A | 0.1 | −7 | | −16 | | −29 | 38.5 | | 31.0 |
| B | 0.1 | −7 | | −16 | | −28 | 38.5 | | 33.3 |

These data show that the composition containing the 0.1 gm. of the higher molecular weight copolymer showed efficiencies of 61.5 and 53.8% respectively in 14 and 21 days. These figures compare favorably with figures normally obtained for cetyl alcohol which are usually in the range of 20 to 30%.

As shown by the test data, the antievaporant compositions of this invention significantly reduce loss of water when applied to the surface. As noted before, they may be applied by pouring on to the surface of water, by mixture with a hydrocarbon dispersing agent and pouring on to the surface, by dispersion as an emulsion, etc. They may also be applied continuously to the surface by various methods such as metering from a tank, etc. When they are dispersed by metering, the flow is adjusted to maintain the concentration of antievaporant on the surface within desired limits. For example, depending upon the prevailing wind conditions and thus the amount of wave action, it may be desirable to employ larger amounts of the material. Usually between 0.1 and 2.0 grams per sq. ft. are sufficient. Amounts of from 0.1 to 1.2 grams per sq. ft. are preferred.

I claim:
1. The method of suppressing the evaporation of water which consists of contacting the surface of the water with a composition consisting essentially of from 70.0 to 99.4% by weight of a hydrocarbon oil boiling predominantly above about 500° F., from 0.5 to 10% by weight of petroleum wax and from 0.1 to 20% by weight of a copolymer of an alkyl methacrylate and vinyl pyrrolidone wherein the copolymer has a molecular weight between about 100,000 and 1,000,000.

2. The method of claim 1 wherein the surface active material is a copolymer of alkyl methacrylate and N-vinyl pyrrolidone and in which the alkyl groups comprise a mixture of $C_{12}$ and $C_{18}$ radicals.

3. As an antievaporant composition, a composition consisting essentially of from 70.0 to 99.4% by weight of a hydrocarbon oil boiling predominantly above about 500° F., from 0.5 to 10% by weight of petroleum wax and from 0.1 to 20% by weight of a copolymer of an alkyl methacrylate and vinyl pyrrolidone wherein the copolymer has a molecular weight between about 100,000 and 1,000,000.

References Cited

UNITED STATES PATENTS 3,095,263  6/1963  Eckert et al. _____ 21—60.5

FOREIGN PATENTS 853,535  11/1963  Great Britain.

OTHER REFERENCES

Schwartz et al.: "Surface Active Agents and Detergents," volume II, 1958, Interscience Publishers, Inc., New York, p. 163.

Kirk-Othmer: "Encyclopedia of Chemical Technology," volume II, 1953, Interscience Encyclopedia, Inc., New York, p. 347, title page, and frontispiece.

MORRIS O. WOLK, *Primary Examiner.*

BARRY S. RICHMAN, *Assistant Examiner.*

U.S. Cl. X.R.

252—351, 357, 384